US012663269B2

(12) United States Patent
Sangap Venugopal Naidu

(10) Patent No.: US 12,663,269 B2
(45) Date of Patent: Jun. 23, 2026

(54) EXTRACTION OF ROUTING CARD INFORMATION OF AN EVENT SYSTEM

(71) Applicant: Honeywell International Inc., Charlotte, NC (US)

(72) Inventor: Sreekanth Sangap Venugopal Naidu, Bengaluru (IN)

(73) Assignee: Honeywell International Inc., Charlotte, NC (US)

( * ) Notice: Subject to any disclaimer, the term of this patent is extended or adjusted under 35 U.S.C. 154(b) by 402 days.

(21) Appl. No.: 18/093,185

(22) Filed: Jan. 4, 2023

(65) Prior Publication Data

US 2024/0219182 A1     Jul. 4, 2024

(51) Int. Cl.
*G01C 21/20* (2006.01)
*G06Q 90/00* (2006.01)
*G06V 10/774* (2022.01)
*G06V 20/62* (2022.01)
*G08B 7/06* (2006.01)

(52) U.S. Cl.
CPC ......... *G01C 21/206* (2013.01); *G06V 10/774* (2022.01); *G06V 20/63* (2022.01); *G08B 7/066* (2013.01); *G06Q 90/205* (2013.01)

(58) Field of Classification Search
CPC .... G01C 21/206; G06V 20/63; G06V 10/774; G08B 7/066; G06Q 90/205
See application file for complete search history.

(56) References Cited

U.S. PATENT DOCUMENTS

| | | | |
|---|---|---|---|
| 11,436,777 B1 | 9/2022 | Karli | |
| 2016/0049064 A1* | 2/2016 | McNabb | G01C 21/206 |
| | | | 340/540 |
| 2017/0064078 A1* | 3/2017 | Dahan | G08B 25/001 |
| 2021/0073433 A1 | 3/2021 | Austern et al. | |
| 2021/0073449 A1* | 3/2021 | Segev | G06F 30/27 |
| 2021/0222877 A1* | 7/2021 | Combe | E05F 15/72 |

(Continued)

FOREIGN PATENT DOCUMENTS

| | | |
|---|---|---|
| EP | 2455713 B1 | 5/2014 |
| EP | 4075401 | 10/2022 |

OTHER PUBLICATIONS

Rüppel, U., Stübbe, K. M., & Zwinger, U. (Sep. 2010). Indoor navigation integration platform for firefighting purposes. In 2010 International Conference on Indoor Positioning and Indoor Navigation (pp. 1-6). IEEE. (Year: 2010).*

(Continued)

*Primary Examiner* — David Perlman
(74) *Attorney, Agent, or Firm* — Brooks, Cameron & Huebsch, PLLC

(57) ABSTRACT

Devices, systems, and methods for extraction of routing card information of an event system are described herein. In some examples, one or more embodiments include a computing device comprising a memory and a processor to execute instructions stored in the memory to receive a file of a routing card associated with a facility including the event system, convert the file to an image, extract facility information, map and routing information, and event device information from the image of the routing card, and generate an output file having the extracted data as metadata in the output file.

16 Claims, 6 Drawing Sheets

(56)        References Cited

U.S. PATENT DOCUMENTS

2022/0092720 A1*   3/2022   Henry   ..............   G06F 16/24575

OTHER PUBLICATIONS

Deliyska, et al., "Methods for developing an indoor navigation system"; Second International Conference on Sustainable Futures: Environmental, Technological, Social and Economic Matters (ICSF) E3S Web of Conferences, vol. 280 (Jun. 30, 2021) (6 pgs) https://doi.org/10.1051/e3sconf/202128004001.

Tekavec, et al., "Cadastral data as a source for 3D indoor modelling"; Elsevier, Land Use Policy, vol. 98, (Jan. 22, 2020) (14 pgs).

Sarot, et al., "Evaluation of Mobile Device Indoor Maps for Orientation Tasks"; Bulletin of Geodetic Sciences, vol. 24 (4), Oct.-Dec. 2018 (21 pgs).

* cited by examiner

100

102 — COMPUTING DEVICE

104 — MOBILE DEVICE

106

CONTROL PANEL

EVENT DEVICE — 108-1

EVENT DEVICE — 108-2

EVENT DEVICE — 108-N

526

526-1

526-2

526-3

526-M

EXTRACTION OF ROUTING CARD INFORMATION OF AN EVENT SYSTEM

TECHNICAL FIELD

The present disclosure relates to devices, systems, and methods for extraction of routing card information of an event system.

BACKGROUND

Facilities, such as commercial facilities, office buildings, hospitals, campuses (e.g., including buildings and outdoor spaces), and the like, may have an event system that can be triggered during an event, such as an emergency situation (e.g., a fire) to warn occupants to evacuate. Such an event system may include a alarm system having a control panel and a number of event devices (e.g., sensors, sounders, pull stations, etc.) located throughout the facility (e.g., on different floors and/or in different rooms of the facility) that can perform an action when an event (e.g., a hazard event, a fault event, etc.) is occurring in the facility. In an example of a hazard event, the number of event devices may provide a notification of the hazard event to the occupants of the facility via alarms and/or other mechanisms.

DETAILED DESCRIPTION

Figure 1:
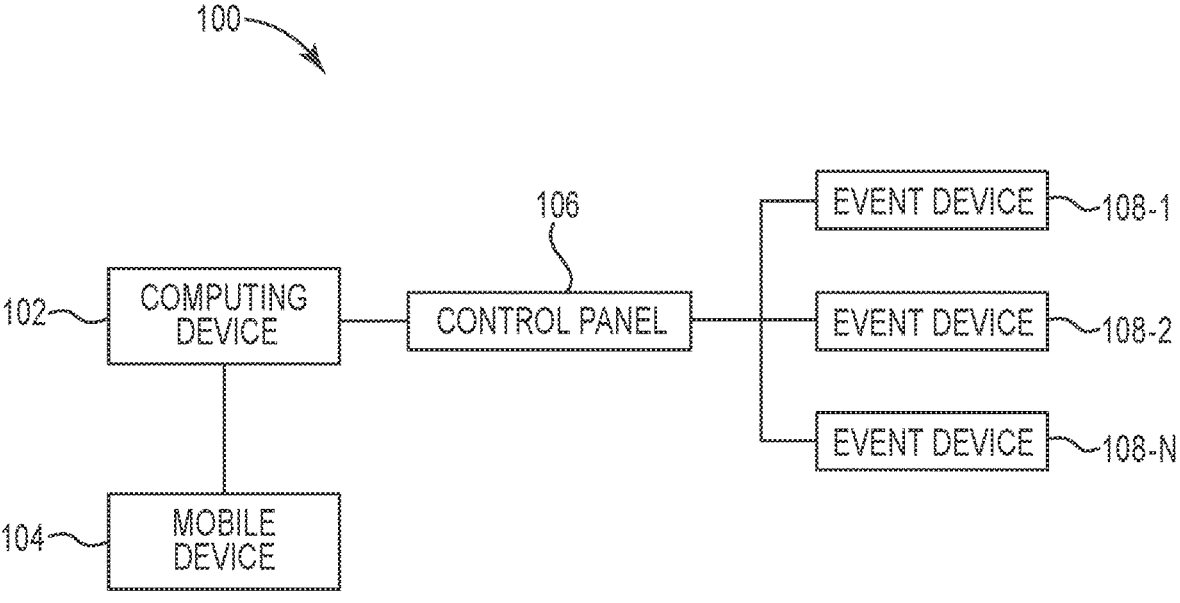
FIG. 1 is an example of an event system for extraction of routing card information of an event system, in accordance with one or more embodiments of the present disclosure.

Devices, systems, and methods for extraction of routing card information of an event system are described herein. In some examples, one or more embodiments include a computing device comprising a memory and a processor to execute instructions stored in the memory to receive a file of a routing card associated with a facility including the event system, convert the file to an image, extract facility information, map and routing information, and event device information from the image of the routing card, and generate an output file having the extracted data as metadata in the output file.

A facility can utilize an event system in order to warn occupants of the facility of an emergency event, such as a fire. An event system can be a system of devices that operate to collect information about a facility and provide the collected information for analysis. Such an event system can also take actions based on the collected information, such as providing an audible and/or visible warning in an emergency event. For example, the event system can utilize event devices to warn occupants of the emergency event occurring in the space, such as a fire. As used herein, the term "event device" refers to a device that can receive an input relating to an event and/or generate an output relating to an event. Such event devices can be a part of the event system of a space in a facility/in the facility at large and can include devices such as fire sensors, smoke detectors, heat detectors, carbon monoxide (CO) detectors, or combinations of these; interfaces; manual call points (MCPs); pull stations; input/output modules; aspirating units; and/or audio/visual devices (e.g., speakers, sounders, flashers, buzzers, microphones, cameras, video displays, video screens, etc.), relay output modules, among other types of event devices.

If an event occurs in the facility, a routing card can be utilized to locate the event device that detected the event. As used herein, the term "routing card" refers to a physical media having directions from an initial location to a location of an event device in a facility. The routing card can be an object specific map that can enable a user (e.g., such as a fire department, building manager, maintenance personnel, etc.) to navigate from the stored location of the routing card to a particular event device in the facility. In addition to the map, the routing card may include other information about the facility and the event device itself.

A routing card can be generated and stored for each event device in the facility. For example, first event device on a first floor of a facility may have one routing card with information about the facility, information about the first event device on the first floor, as well as map and routing information to the first event device. Similarly, a second event device on a fifth floor of the facility may have a different routing card with information about the facility, information about the second event device, as well as map and routing information to the second event device. In the facility, there may be a large number of event devices. Accordingly, the number of routing cards may also be large.

When an event is detected, a user can determine which event device detected the event (e.g., via a control panel for the event system), locate a routing card associated with the event device, and utilize the routing card to navigate to and locate the event device in the facility. In certain jurisdictions, such routing cards may be mandated so that they are available for emergency services to utilize. However, as mentioned above, if there are many routing cards, it may take time for a user to locate a particular routing card. In an emergency situation, locating the particular routing card may take time that may otherwise be spent addressing the emergency situation (e.g., fighting a fire, assisting an injured person, etc.).

Extraction of routing card information of an event system according to the disclosure can allow for routing cards to be digitized for use in a facility. Therefore, when an event occurs, the user can view information from the routing card on a computing device, such as a mobile device, rather than manually locate a physical routing card. Such an approach can allow for faster location of routing card information so that a user can locate an event device in the facility faster as compared with previous approaches, especially in a facility with a large number of event devices. Accordingly, a user can address an event more quickly, especially if the event is an emergency event, as compared with previous approaches In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 602 in FIG. 6.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is an example of an event system 100 for extraction of routing card information of an event system, in accordance with one or more embodiments of the present disclosure. The event system 100 can include a computing device 102, a mobile device 104, a control panel 106, and event devices 108-1, 108-2, 108-N.

As mentioned above, the event system 100 can be included in a facility, a space in a facility, etc. The event system 100 can include a device/series of devices in order to detect events and/or process and/or analyze the detected events to determine whether to generate an alarm for occupants of the facility.

The event system 100 can include event devices 108-1, 108-2, 108-N (referred to collectively as event devices 108). The event devices 108 can be devices to detect an event and transmit the detected event for processing and/or analysis. As mentioned above, the event devices 108 can include, for example, cameras, motion sensors, fire sensors, smoke detectors, heat detectors, carbon monoxide (CO) detectors, or combinations of these; interfaces; manual call points (MCPs); pull stations; input/output modules; aspirating units; sprinkler controls; and/or audio/visual devices (e.g., speakers, microphones, cameras, video displays, video screens, etc.), relay output modules, among other types of event devices.

The event system 100 can further include a control panel 106. The control panel 106 can be utilized to control the various event devices 108 included in the event system 100.

The control panel 106 can be connected to the event devices 108. For example, the control panel 106 may be connected to the event devices 108 via a gateway device (e.g., not illustrated in FIG. 1). The gateway device can be a device (e.g., a building system gateway) that provides a communication link between the control panel 106 and event devices 108. For example, the gateway device may enable transmission of data (e.g., system device data, activation signals, etc.) from the control panel 106 to the event devices 108 and transmission of data from the event devices 108 to the control panel 106.

As illustrated in FIG. 1, the event devices 108 and computing device 102 can be connected to the control panel 106, and the mobile device 104 can be connected to the computing device 102. Such devices can be connected via a network relationship. Examples of such a network relationship can include a local area network (LAN), wide area network (WAN), personal area network (PAN), a distributed computing environment (e.g., a cloud computing environment), storage area network (SAN), Metropolitan area network (MAN), a cellular communications network, Long Term Evolution (LTE), visible light communication (VLC), Bluetooth, Worldwide Interoperability for Microwave Access (WiMAX), Near Field Communication (NFC), infrared (IR) communication, Public Switched Telephone Network (PSTN), radio waves, and/or the Internet, among other types of network relationships.

As used herein, the term "computing device" refers to an electronic system having a processing resource, memory resource, and/or an application-specific integrated circuit (ASIC) that can process information. Examples of computing devices can include, for instance, a laptop computer, a notebook computer, a desktop computer, an All-In-One (AIO) computing device, a server, networking equipment (e.g., router, switch, etc.), and/or a mobile device, among other types of computing devices. As used herein, a mobile device can include devices that are (or can be) carried and/or worn by a user. For example, a mobile device can be a phone (e.g., a smart phone), a tablet, a personal digital assistant (PDA), smart glasses, and/or a wrist-worn device (e.g., a smart watch), among other types of mobile devices.

As mentioned above, the event devices 108 can be located in areas around the facility. For example, the event device 108-1 may be located on a first floor of the facility in an entrance to a gym, the event device 108-2 may be located on a second floor of the facility in a conference room, the event device 108-N may be located on a third floor of the facility in an office, etc. In previous approaches, each of the event devices 108 may include a corresponding physical routing card printed on a print medium (e.g., a sheet of paper) that would detail information about the facility, information about the event device 108-1, as well as map and routing information to the event device 108-1. Such a routing card could allow a user to navigate from the stored location of the routing card to the event device 108-1 in the facility. However, extraction of routing card information of an event system, according to the disclosure, can allow for such routing cards to be scanned and digitized, allowing for display of an event routing report on the mobile device 104 detailing information about the facility, information about the event device 108-1, as well as map and routing information to the event device 108-1, among other information, as is further described herein. Accordingly, when an event device 108 detects an event, such routing card information can be displayed on a display of the mobile device 104, as is further described herein.

Figure 2:
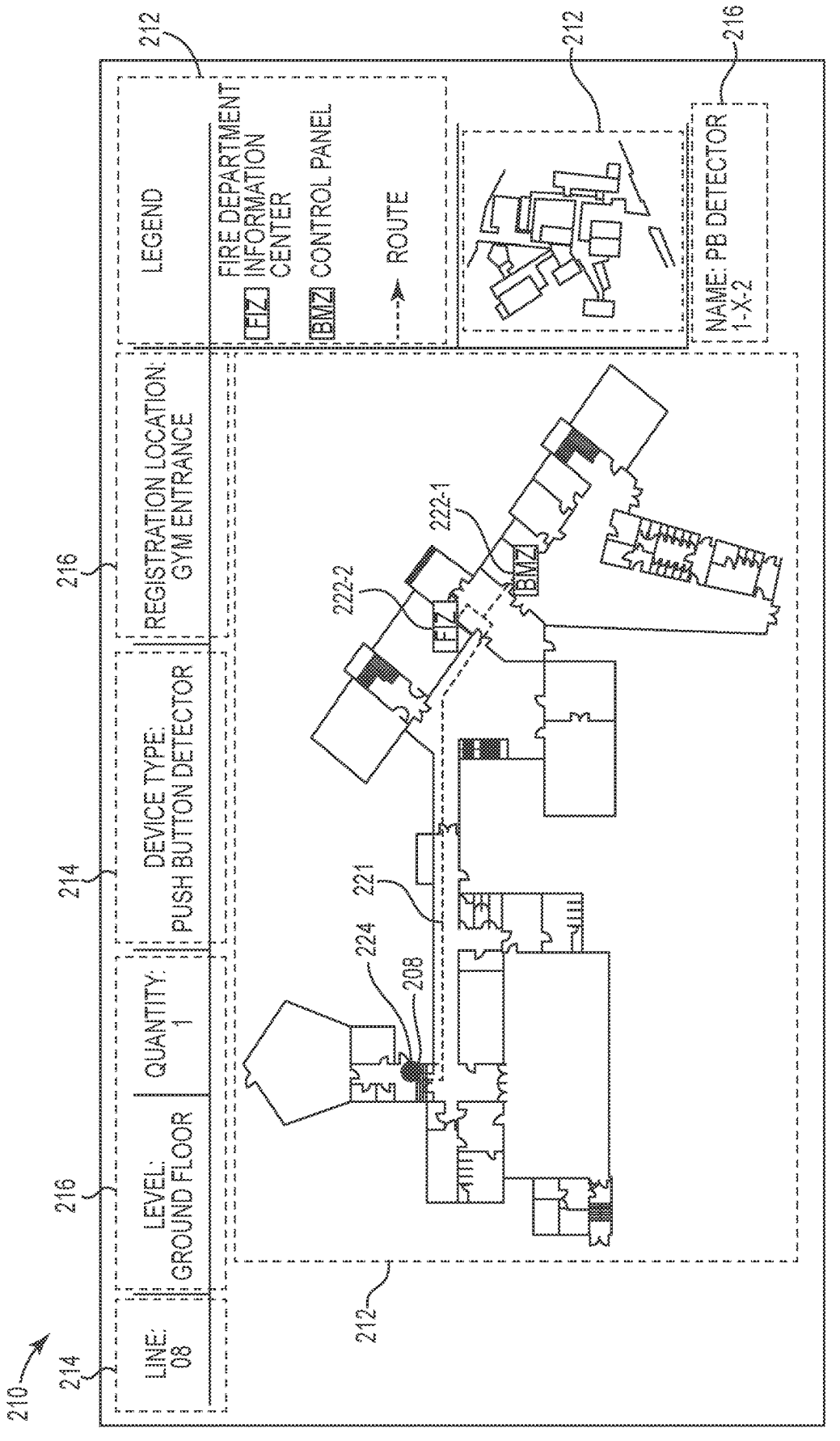
FIG. 2 is an example of a routing card for extraction of routing card information of an event system, in accordance with one or more embodiments of the present disclosure.

FIG. 2 is an example of a routing card 210 for extraction of routing card information of an event system, in accordance with one or more embodiments of the present disclosure. The routing card 210 can include map and routing information 212, event device information 214, and facility information 216.

The computing device (e.g., computing device 102, previously described in connection with FIG. 1) can receive a file of a routing card 210 associated with a facility including an event system. The file can be a scanned file (e.g., the physical routing card can be scanned via a scanner device and converted to a digital image), the file can be a photograph (e.g., a mobile device such as mobile device 104 can take a photograph of the physical routing card), the file can be an existing digital file, etc. The file can be of a first file type. Such file types can include, for example, ZIP, PDF, JPG/JPEG, CAD, and/or any other type of file type.

In some examples, the file can be one of a plurality of files. For example, the computing device can receive a plurality of files, each corresponding to a particular physical routing card associated with the facility including the event system. While examples described herein relate to receiving a single scanned file, converting the scanned file to an image, and extracting information from the image, embodiments of the present disclosure are not so limited. For example, the computing device can similarly receive the plurality of files, convert the plurality of files to a corresponding plurality of images, and extract information from each image of the plurality of images.

As mentioned above, the computing device can convert the received file to an image. For example, the computing device can convert the received file to an image file having a two-dimensional grid of pixels such that map and routing information 212, facility information 216, and event device information 214 can be extracted from the image, as is further described herein.

The computing device can extract map and routing information 212 from the image of the routing card 210 via a machine learning model. In order to utilize the machine learning model, the computing device can train the machine learning model. For example, the machine learning model may be trained utilizing a training image (e.g., not illustrated in FIG. 2 for clarity and so as not to obscure embodiments of the present disclosure). The training image can include a predetermined scan area, and the computing device can be instructed to cause the machine learning model to locate the predetermined scan area. The predetermined scan area can be an area of an image which includes map and routing information. Such a process can be repeated so that the machine learning model is trained to locate map and routing information in images. Accordingly, the trained machine learning model can locate and extract the map and routing information 212 of the routing card 210.

As illustrated in FIG. 2, the map and routing information 212 can include a map of a zone of the facility. For example, the map can be of a first floor of the facility (e.g., the zone) and can illustrate a location of the event device 208 associated with the routing card 210 in the zone.

The map and routing information 212 can further include a shortest route 221 from an initial location 222 to a location 224 in the zone of the facility. In some examples, the initial location 222 can correspond to a current geographical location of the mobile device in the facility, the initial location 222-1 can correspond to a control panel of the facility, the initial location 222-2 can correspond to a fire department information center of the facility, etc. The shortest route 221 can detail the route from the initial location 222 to the location 224 of the event device 208 in the zone.

The map and routing information 212 can further include a map legend defining symbols located on the map of the zone. For example, the map legend can define various acronyms located on the map, such as FIZ (e.g., fire department information center), BMZ (e.g., control panel), the shape and/or color of the line indicating the shortest route, etc.

Although the map and routing information 212 is described above as including a map of a zone of the facility, the shortest route 221, and/or the map legend, embodiments of the present disclosure are not so limited. For example, the map and routing information 212 can include any other information illustrating and/or describing a diagram of the facility.

The computing device can additionally extract facility information 216 from the image of the routing card 210. Such facility information 216 can be textual, and can be extracted by performing text recognition on the image. For example, the computing device can extract information such as a zone of the facility (e.g., ground floor), a location in the zone (e.g., gym entrance), a map identifier identifying a map (e.g., PB Detector map for event device 1-X-2), a number of event devices in the location in the zone (e.g., 1), etc.

Although the facility information 216 is described above as including a zone of the facility, a location in the zone, a map identifier, and/or a number of event devices in the location in the zone, embodiments of the present disclosure are not so limited. For example, the facility information 216 can include any other information illustrating and/or describing information about the facility.

The computing device can additionally extract event device information 214 from the image of the routing card 210. Such event device information 214 can be textual, and can be extracted by performing text recognition on the image. For example, the computing device can extract information such as a device identifier of the device, a device type (e.g., push button detector), connection information such as connection/wiring loop (e.g., connection line 08), etc.

Although the event device information 214 is described above as including a device identifier of the event device, a device type of the event device, and connection information of the event device, embodiments of the present disclosure are not so limited. For example, the facility information 216 can include any other information illustrating and/or describing information about the facility.

Once such data is extracted, the computing device can generate an output file having a second file type that is different from the first file type. The output file can include the extracted data (e.g., the facility information 216, the event device information 214, and the map and routing information 212) as metadata in the output file. The output file can be transmitted to a mobile device in response to an event occurring in the facility associated with the vent device, as is further described in connection with FIGS. 3 and 4.

Figure 3:
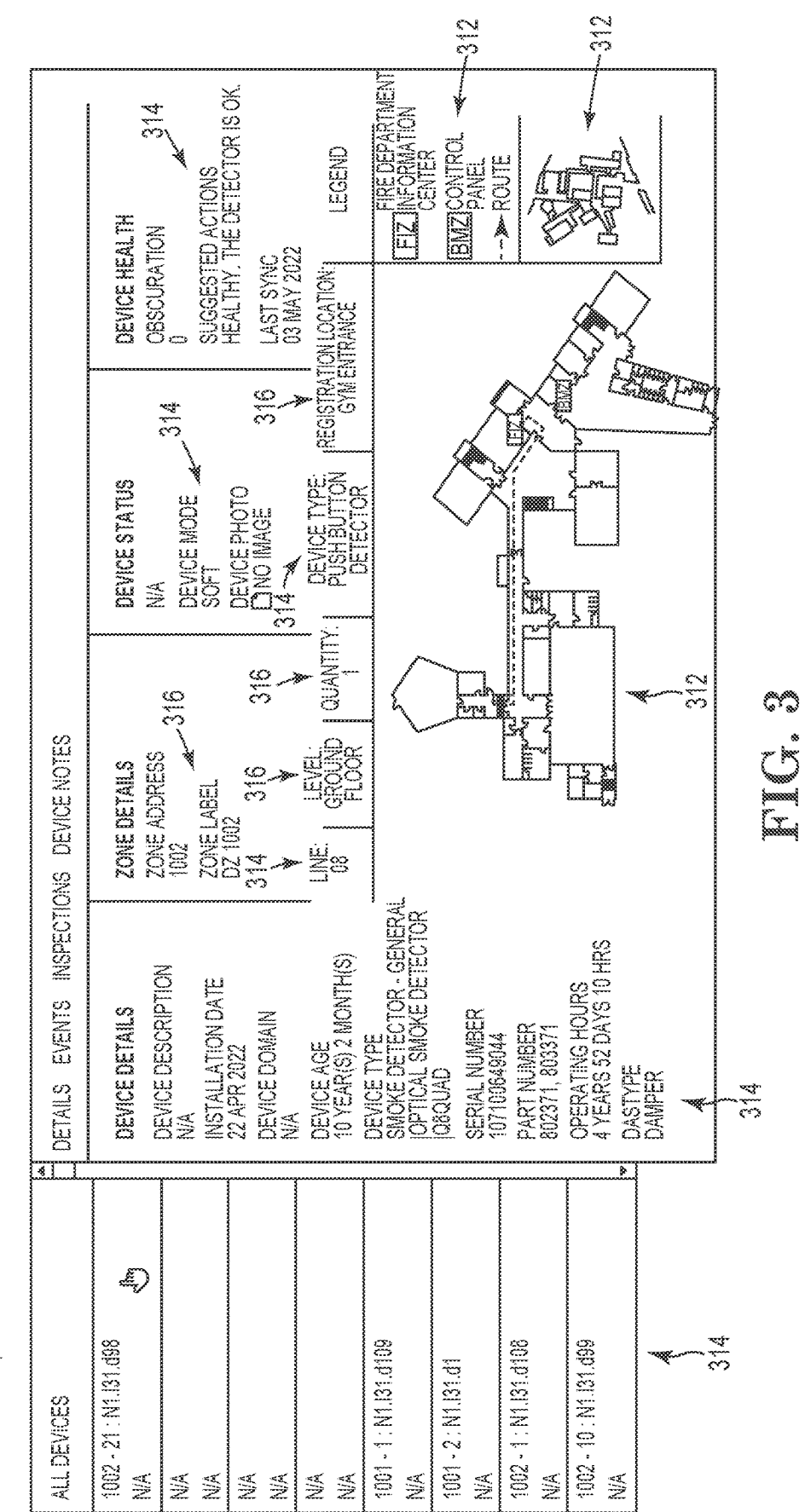
FIG. 3 is an example of an event routing report for extraction of routing card information of an event system, in accordance with one or more embodiments of the present disclosure.

FIG. 3 is an example of an event routing report 320 for extraction of routing card information of an event system, in accordance with one or more embodiments of the present disclosure. The event routing report 320 can include map and routing information 312, event device information 314, and facility information 316.

As mentioned above, the computing device (e.g., computing device 102, previously described in connection with FIG. 1) can store an output file having metadata corresponding to a plurality of routing cards associated with a facility including an event system. Accordingly, if an event device in the facility detects an event, an event routing report 320 associated with the event device can be displayed on a mobile device (e.g., mobile device 104, previously described in connection with FIG. 1), as is further described herein.

If an event device detects an event, the mobile device can receive a notification of the event occurring in the facility. Such a notification can alert a user of the mobile device to the detected event. For example, a push button detector has received an input and a notification of the event can be received by the mobile device. In response, the mobile device may emit a sound, flash a light, output a tactile response (e.g., vibration), display a textual notification on a user interface of a display of the mobile device, etc.

Additionally, the mobile device can display the event routing report 320 corresponding to the event. As illustrated in FIG. 3, the event routing report 320 can include similar information to a routing card. For example, the event routing report 320 can include map and routing information 312, textual event device information 314, and textual facility information 316, as is further described herein.

For example, the event routing report 320 can include the map and routing information 312. Such information can include the map of the facility, the shortest route from an initial location to the location of the event device in the facility, etc. Such information can be the same and/or similar information as that included on a routing card previously scanned that was associated with the event device that detected the event.

Additionally, as illustrated in FIG. 3, the event routing report 320 can include the event device information 314 associated with the event device. For example, the event device information 314 can be the same and/or similar information as that included on the routing card. Additionally, further event device information may be included on the event routing report 320, such as additional device detail information (e.g., device description, installation date, device domain, device age, detailed device type, serial number, part number, operating hours, DAS type, real-time device status, an image/photograph of the device, real-time device health information, etc.). Further, the event routing report 320 can include other devices in a scrollable menu such that a user may click on other event devices to check event device information associated with the other event devices. For example, event device 1002 is selected for display of information in the event routing report 320. However, a user may select event device 1001 to display information in a different event routing report for the event device 1001, even if the event device 1001 has not detected an event.

Further, as illustrated in FIG. 3, the event routing report 320 can include the facility information 316 associated with the facility. For example, the facility information 316 can be the same and/or similar information as that included on the routing card. Additionally, further facility information may be included on the event routing report 320, such as additional zone details (e.g., zone address, zone labels, etc.). Further, selection of another event device (e.g., event device 1001) can allow a different event routing report for the event device 1001 to display facility information associated with the event device 1001.

Figure 4:
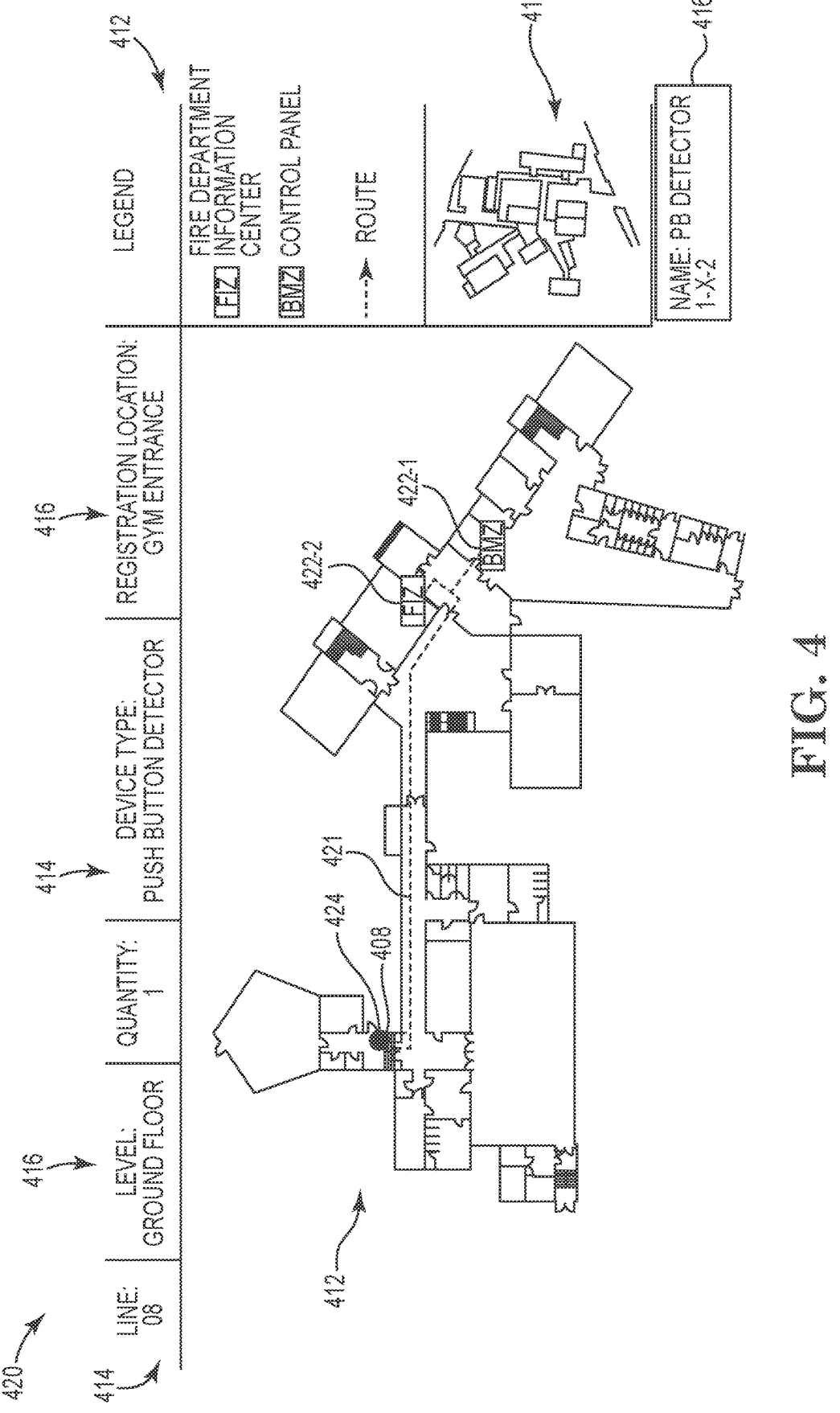
FIG. 4 is an example of an event routing report having map and routing information including a route to an event device for extraction of routing card information of an event system, in accordance with one or more embodiments of the present disclosure.

FIG. 4 is an example of an event routing report 420 having map and routing information 412 including a route 421 to an event device 408 for extraction of routing card information of an event system, in accordance with one or more embodiments of the present disclosure. The event routing report 420 can include the map and routing information 412, event device information 414, and facility information 416.

If a user selects map and routing information from the event routing report previously illustrated in FIG. 3, the event routing report 420 can further display a larger version of the map and routing information 412 on the mobile device. Such a larger version can be similar to the scanned image of the routing card previously illustrated in FIG. 2. For example, map and routing information 412, event device information 414, and facility information 416 can be displayed in the event routing report 420.

As previously described in connection with FIG. 2, a route 421 can be shown. The route 421 can be the shortest route to the event device 408 from an initial location 422. Accordingly, a user can follow the route 421 to the event device 408 from an initial location 422 to investigate the detected event utilizing the event routing report 420.

In some examples, the initial location 422-1 can be a location corresponding to a control panel. For example, the user can follow the shortest route 421 from the initial location 422-1 at the control panel of the facility to the location 424 of the event device 408 in the facility.

In some examples, the initial location 422-2 can be a location corresponding to an information center. The information center can be a control room of the facility, a fire department information center, etc. The user can follow the shortest route 421 from the initial location 422-2 at the information center of the facility to the location 424 of the event device 408 in the facility.

In some examples, the initial location 422 can be a current geographic location of the mobile device. For example, the mobile device may be located in the information center (e.g., location 422-2), and the shortest route 421 can be from the current geographic location of the mobile device to the location 424 of the event device 408.

In some examples, the event routing report 420 can update the current geographic location of the mobile device as the mobile device moves in the facility. For example, the event routing report 420 can show a location of the mobile device via the map and routing information 412 (e.g., via an icon) in real-time so that a user of the mobile device that is transiting to the location 424 of the event device 408 can see their current location.

The mobile device can cause the event device 408 to take an action in response to a user input to the mobile device. For instance, when a user carrying the mobile device arrives at the location 424 of the event device 408, the user can provide an input to the mobile device to cause the event device 408 to take an action. Such actions may include silencing an alarm, turning on or off output modules (e.g., flashers, sounders, etc.), among other actions. Such an input to the mobile device may become available in response to the mobile device being within a threshold distance of the event device 408.

Figure 5:
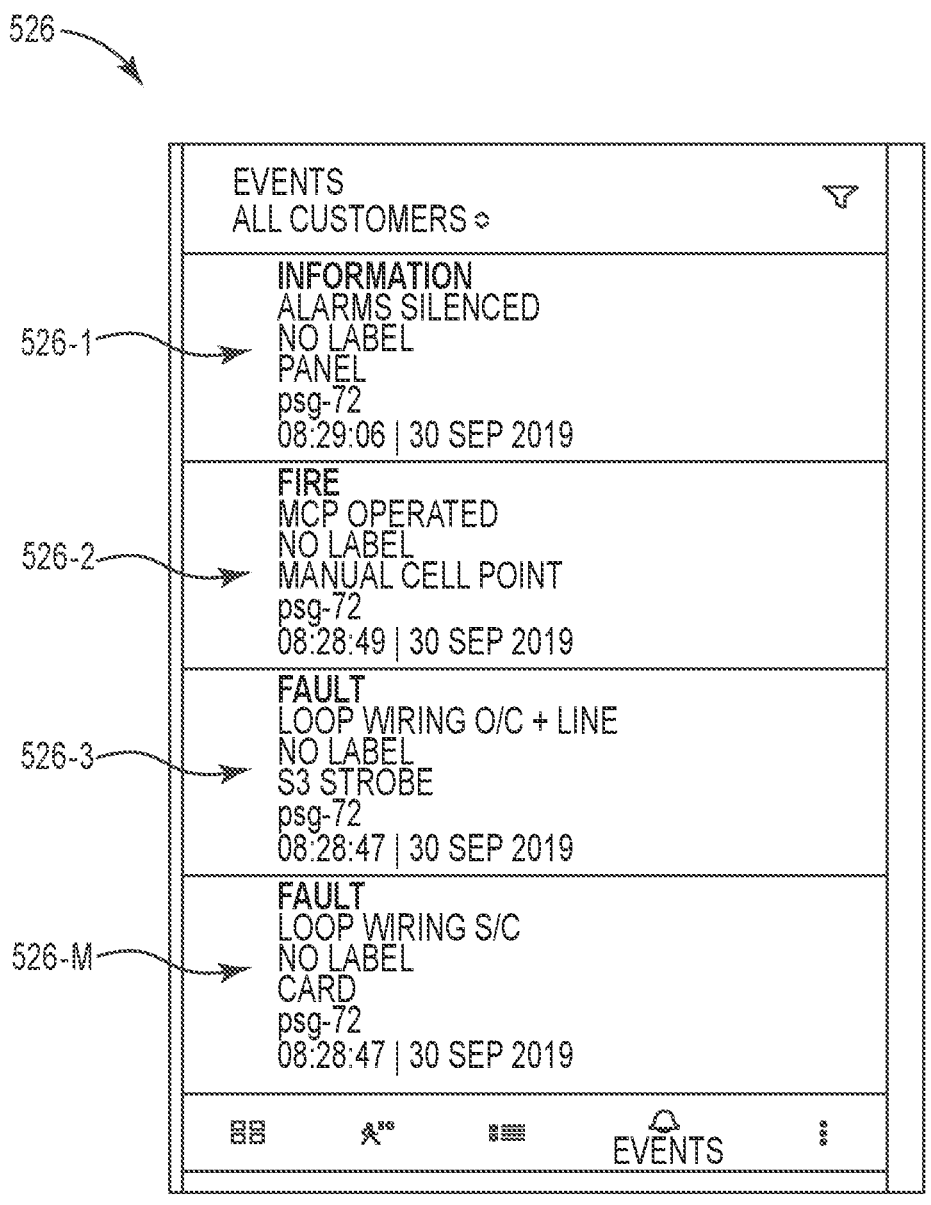
FIG. 5 is an example of a list of notifications for extraction of routing card information of an event system, in accordance with one or more embodiments of the present disclosure.

FIG. 5 is an example of a list of notifications 526 for extraction of routing card information of an event system, in accordance with one or more embodiments of the present disclosure. The list of notifications can be displayed on a user interface of a mobile device.

As illustrated in FIG. 5, the mobile device can display a list of notifications 526. The notifications 526 can correspond to events detected by event devices in the facility. For example, there may be 4 events detected by different event devices in the facility, and as such 4 notifications can be displayed each corresponding to an event of the 4 events. For instance, as illustrated in FIG. 5, notification 526-1 can correspond to a first event of an alarm having been silenced, notification 526-2 can correspond to a second event in which an event device has detected a fire, notification 526-3 can correspond to a third event in which a fault is detected on a loop wire, notification 526-M can correspond to a fourth event in which another fault is detected on a loop wire, etc.

In some examples, the notifications 526 can be prioritized. For example, the notifications 526 can be prioritized based on an alarm type of each event device associated with a plurality of events. For example, a particular alarm type (e.g., a fire) may be prioritized and displayed before a different alarm (e.g., a fault), as the fire alarm may be more important to address before a wiring fault.

In some examples, the notifications 526 can be prioritized based on a device type that detected an event. For example, an event device that detects smoke and/or heat may have notifications that are prioritized and displayed before notifications corresponding to fault events.

In some examples, the notifications 526 can be prioritized based on a location of various event devices. For example, a facility may include areas with high security (e.g., a secure laboratory, etc.), and notifications corresponding to events occurring in the high security area may be prioritized and displayed before notifications corresponding to an event in a less secure area (e.g., a parking garage).

Accordingly, extraction of routing card information of an event system according to the disclosure can allow for fast access to information relating to an event as compared with previous approaches. A user no longer has to manually determine an event device that has detected an event and locate a physical routing card associated with that event device. Accordingly, the user can locate the event device in the facility and address an event more quickly, as compared to previous approaches.

Figure 6:
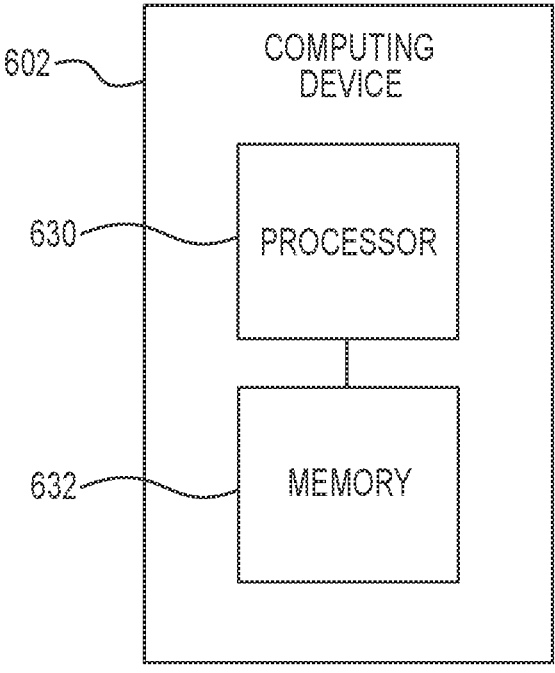
FIG. 6 is an example of a computing device for extraction of routing card information of an event system, in accordance with one or more embodiments of the present disclosure.

FIG. 6 is an example of a computing device 602 for extraction of routing card information of an event system, in accordance with one or more embodiments of the present disclosure. As illustrated in FIG. 6, the computing device 602 can include a memory 632 and a processor 630 for extraction of routing card information of an event system, in accordance with the present disclosure.

The memory 632 can be any type of storage medium that can be accessed by the processor 630 to perform various examples of the present disclosure. For example, the memory 632 can be a non-transitory computer readable medium having computer readable instructions (e.g., executable instructions/computer program instructions) stored thereon that are executable by the processor 430 for transmission of data to fire devices of a fire system in accordance with the present disclosure.

The memory 632 can be volatile or nonvolatile memory. The memory 632 can also be removable (e.g., portable) memory, or non-removable (e.g., internal) memory. For example, the memory 632 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 632 is illustrated as being located within computing device 602, embodiments of the present disclosure are not so limited. For example, memory 632 can also be located internal to another computing resource (e.g., enabling computer readable instructions to be downloaded over the Internet or another wired or wireless connection).

The processor 630 may be a central processing unit (CPU), a semiconductor-based microprocessor, and/or other hardware devices suitable for retrieval and execution of machine-readable instructions stored in the memory 632.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for extraction of routing card information of an event system, comprising:

a memory; and a processor configured to execute executable instructions stored in the memory to:

receive a file of a routing card associated with a facility including the event system, wherein the routing card includes directions from a designated location to a location of a corresponding event device associated with the routing card;

convert the file to an image;

extract facility information, map and routing information, and event device information from the image of the routing card via a machine learning model;

generate an output file having the extracted facility information, map and routing information, and event device information as metadata in the output file; and transmit, in response to an event device of the event system detecting an event at a location of the facility, an event routing report based on the output file to a mobile device, wherein the event routing report includes event device information associated with the event device that detected the event, a map based on the event device that detected the event, and routing information on the map for a route from a location of the mobile device to the location of the event device that detected the event.

2. The computing device of claim 1, wherein the processor is configured to:

train the machine learning model to locate, in a training image, a predetermined scan area; and extract the map and routing information from the file using the trained machine learning model.

3. The computing device of claim 1, wherein the processor is configured to extract the facility information and the event device information by performing text recognition on the image.

4. The computing device of claim 1, wherein the facility information extracted from the image includes at least one of:

a zone of the facility;

a location in the zone;

a map identifier identifying a map; and a number of event devices in the location in the zone.

5. The computing device of claim 1, wherein the map and routing information extracted from the image includes at least one of:

a map of a zone of the facility;

a shortest route from an initial location to a location in the zone of the facility; and a map legend defining symbols located on the map of the zone.

6. The computing device of claim 1, wherein the event device information extracted from the image includes at least one of:

a device identifier of the event device;

a device type of the event device; and connection information of the event device.

7. The computing device of claim 1, wherein:

the file is of a first file type; and the output file is of a second file type that is different from the first file type.

8. A system for extraction of routing card information of an event system, comprising:

a computing device configured to store an output file having metadata corresponding to a routing card associated with a facility including the event system, wherein the routing card includes directions from a designated location within the facility to a location of a corresponding event device associated with the routing card; and a mobile device configured to:

receive a notification of an event occurring in the facility detected by an event device; and display an event routing report corresponding to the event, wherein the event routing report includes:

textual facility information associated with a location of the event device within the facility;

a map of the facility based on the location of the event device;

routing information including a route displayed on the map from a current location of the mobile device to the location of the event device in the facility; and textual event device information associated with the event device.

9. The system of claim 8, wherein the mobile device is configured to cause the event device to take an action in response to a user input to the mobile device.

10. The system of claim 9, wherein the mobile device is configured to update a current geographic location of the mobile device as the mobile device moves in the facility.

11. A method for extraction of routing card information of an event system, comprising:

receiving, by a computing device, a plurality of files of a corresponding plurality of routing cards associated with a facility including the event system, wherein each of the plurality of routing cards includes directions from a corresponding designated location to a corresponding location of event devices associated with each of the plurality of routing cards;

converting, by the computing device, the plurality of files to a corresponding plurality of images;

extracting, by the computing device, data including textual facility information, map and routing information, and textual event device information from each image of the plurality of images;

generating, by the computing device, an output file having the extracted textual facility information, map and routing information, and textual event device information as metadata in the output file;

displaying, by a mobile device in response to an event occurring in the facility, an event routing report corresponding to a particular event device of the plurality of event devices detecting the event, wherein the event routing report includes:

the textual facility information associated with the particular event device and a corresponding location of the particular event device within the facility;

the map and routing information including a route from a current location of the mobile device to the location of the particular event device in the facility; and the textual event device information associated with the particular event device; and causing, by the mobile device, the particular event device to take an action in response to a user input to the mobile device.

12. The method of claim 11, wherein the method further includes displaying, by the mobile device in response to a plurality of events occurring in the facility, a plurality of notifications each corresponding to an event of the plurality of events.

13. The method of claim 12, wherein the method includes prioritizing, by the mobile device, the plurality of notifications.

14. The method of claim 13, wherein the mobile device is configured to prioritize the plurality of notifications based on an alarm type, a device type, and a device location of each event device associated with each one of the plurality of events.

15. The method of claim 11, wherein the corresponding designated location is a storage location of the plurality of routing cards within facility.

16. The method of claim 11, wherein the plurality of routing cards each include information related to a corresponding event devices associated with the plurality of routing cards.

* * * * *